United States Patent
Utsunomiya et al.

(10) Patent No.: US 10,003,079 B2
(45) Date of Patent: Jun. 19, 2018

(54) GAS DIFFUSION ELECTRODE MEDIUM FOR FUEL CELL

(71) Applicant: Toray Industries, Inc., Tokyo (JP)

(72) Inventors: Masamichi Utsunomiya, Otsu (JP); Toshiya Kamae, Otsu (JP)

(73) Assignee: Toray Industries, Inc. (JP)

( * ) Notice: Subject to any disclaimer, the term of this patent is extended or adjusted under 35 U.S.C. 154(b) by 392 days.

(21) Appl. No.: 14/398,842

(22) PCT Filed: Apr. 25, 2013

(86) PCT No.: PCT/JP2013/062228
§ 371 (c)(1),
(2) Date: Nov. 4, 2014

(87) PCT Pub. No.: WO2013/172174
PCT Pub. Date: Nov. 21, 2013

(65) Prior Publication Data
US 2015/0118596 A1    Apr. 30, 2015

(30) Foreign Application Priority Data

May 14, 2012 (JP) ................................. 2012-110240

(51) Int. Cl.
*H01M 4/86* (2006.01)
*H01M 4/96* (2006.01)
*H01M 8/1018* (2016.01)

(52) U.S. Cl.
CPC ....... *H01M 4/8626* (2013.01); *H01M 4/8657* (2013.01); *H01M 4/96* (2013.01); *H01M 2008/1095* (2013.01); *H01M 2300/0082* (2013.01)

(58) Field of Classification Search
CPC ............. H01M 4/8626; H01M 4/8657; H01M 4/8807; H01M 4/96

USPC .......................................................... 429/481
See application file for complete search history.

(56) References Cited

U.S. PATENT DOCUMENTS

| 2003/0003348 A1* | 1/2003 | Hanket | H01M 4/8605 429/498 |
| 2008/0096110 A1* | 4/2008 | Bito | H01M 4/131 429/220 |
| 2010/0028750 A1* | 2/2010 | Ji | H01M 8/0234 429/465 |
| 2011/0220841 A1* | 9/2011 | Zheng | C09K 5/063 252/71 |

FOREIGN PATENT DOCUMENTS

| JP | 9-245800 | 9/1997 |
| JP | 2000-123842 | 4/2000 |
| JP | 2002-280004 | 9/2002 |
| JP | 2003-213137 | 7/2003 |
| JP | 2008-59917 | 3/2008 |
| JP | 2008-293937 | 12/2008 |
| JP | 2008-305610 | 12/2008 |
| WO | 2011/074327 | 6/2011 |

* cited by examiner

*Primary Examiner* — Basia A Ridley
*Assistant Examiner* — James M Erwin
(74) *Attorney, Agent, or Firm* — DLA Piper LLP (US)

(57) ABSTRACT

A gas diffusion electrode medium is for a fuel cell, has a low in-plane gas permeability and favorable water drainage characteristics in addition to high conductivity, and is able to exhibit high cell performance across a wide temperature range from low temperatures to high temperatures. The gas diffusion electrode medium is characterized by a microporous region being disposed at least at one surface of an electrode substrate, and the microporous region containing flake graphite having an aspect ratio of 50-5000.

5 Claims, No Drawings

GAS DIFFUSION ELECTRODE MEDIUM FOR FUEL CELL

TECHNICAL FIELD

This disclosure relates to a gas diffusion electrode medium suitably used for a fuel cell, particularly for a polymer electrolyte fuel cell. More particularly, the disclosure relates to a gas diffusion electrode medium excellent in its anti-flooding, anti-plugging and anti-dry-out characteristics and capable of exerting high cell performance across a wide temperature range from low to high temperatures and has excellent mechanical properties, electrical conductivity and thermal conductivity.

BACKGROUND

A polymer electrolyte fuel cell in which a hydrogen-containing fuel gas and oxygen-containing oxidizing gas are supplied to an anode and cathode, respectively, and an electromotive force is generated by bipolar electrochemical reaction is generally constituted of sequentially laminating a bipolar plate, a gas diffusion electrode medium, a catalyst layer, an electrolyte membrane, a catalyst layer, a gas diffusion electrode medium and a bipolar plate. The gas diffusion electrode medium is required to have high gas diffusibility to allow a gas supplied from the bipolar plate to be diffused into the catalyst and high drainage property to drain liquid water generated by electrochemical reaction to the bipolar plate as well as high electrical conductivity to extract generated electric current, and electrode base materials composed of carbon fibers and the like are widely used.

However, the following problems are known: (1) when such a polymer electrolyte fuel cell is operated at a relatively low temperature of below 70° C. in a high current density region, as a result of blockage of the electrode base material by liquid water generated in a large amount and shortage in the fuel gas supply, cell performance is impaired (this problem is hereinafter referred to as "flooding"); (2) when such a polymer electrolyte fuel cell is operated at a relatively low temperature of below 70° C. in a high current density region, as a result of blockage of gas flow channels (hereinafter, referred to as "flow channel") of the bipolar plate by liquid water generated in a large amount and shortage in the fuel gas supply, cell performance is momentarily impaired (this problem is hereinafter referred to as "plugging"); and (3) when such a polymer electrolyte fuel cell is operated at a relatively high temperature of 80° C. or higher, as a result of drying of the electrolyte membrane due to water vapor diffusion and a reduction in the proton conductivity, cell performance is impaired (this problem is hereinafter referred to as "dry-out"). Various efforts have been made to solve these problems of (1) to (3).

JP 2000-123842A proposes a gas diffusion electrode medium in which a microporous region composed of a carbon black and a water-repelling resin is formed on the catalyst layer side of an electrode base material. According to a fuel cell comprising this gas diffusion electrode medium, since the microporous region has a fine pore structure having water repellency, drainage of liquid water of the cathode side is facilitated so that flooding tends to be inhibited. In addition, since generated water is forced back to the electrolyte membrane side (hereinafter, this phenomenon is referred to as "back-diffusion"), the electrolyte membrane is wetted and the problem of dry-out thus tends to be inhibited.

JP 2008-059917A proposes a gas diffusion electrode medium in which a microporous region composed of a scale-like graphite, a carbon black and a water-repelling resin is formed on the catalyst layer side of an electrode base material. According to a fuel cell comprising this gas diffusion electrode medium, since drainage property and water repellency can be adjusted by a scale-like graphite, so that flooding and dry-out tend to be inhibited.

In JP H9-245800A and JP 2008-293937 A, fuel cells comprising a gas diffusion electrode medium in which a microporous region composed of a carbon black and a hydrophobic resin is formed on both sides of an electrode base material are proposed. According to these fuel cells comprising the gas diffusion electrode medium, since the microporous region on the bipolar plate side is smooth and has high water repellency, the flow channel is unlikely to retain liquid water, so that plugging tends to be inhibited. In addition, as a result of facilitation of back-diffusion of a water content to the electrolyte membrane by the microporous region formed on the catalyst layer side and inhibition of water vapor diffusion by the microporous region formed on the bipolar plate side, the electrolyte membrane is wetted and the problem of dry-out tends to be inhibited.

However, in JP 2000-123842A and JP 2008-059917A, there is a problem that flooding and dry-out are still not adequately inhibited and plugging is not improved at all.

Furthermore, in JP H9-245800A and JP 2008-293937 A, there is a problem that prominent flooding occurs because drainage of water from the electrode base material to the bipolar plate is inhibited by the microporous region on the bipolar plate side.

As described above, a variety of technologies have been proposed. However, a gas diffusion electrode medium having excellent anti-flooding and anti-plugging characteristics as well as excellent anti-dry-out characteristic is yet to be discovered.

Therefore, it could be helpful to provide a gas diffusion electrode medium excellent in its anti-flooding, anti-plugging and anti-dry-out characteristics and capable of exerting high cell performance across a wide temperature range from low to high temperatures and has excellent mechanical properties, electrical conductivity and thermal conductivity.

SUMMARY

We thus provide:

A gas diffusion electrode medium for a fuel cell, characterized in that a microporous region is arranged on at least one surface of an electrode base material, and the microporous region contains a flake graphite having an aspect ratio in the range of 50 to 5000.

Preferably, the microporous region is arranged on both surfaces of an electrode base material. Preferably, a mean thickness of the flake graphite is in the range of 0.001 to 0.5 µm. Further preferably, the flake graphite has a surface oxygen concentration {O/C} measured by X-ray photoelectron spectroscopy in the range of 0.01 to 0.1. Still further preferably, the microporous region containing the flake graphite further contains acetylene black, and a mixing mass ratio of the acetylene black to the flake graphite is 0.1 to 4.

Gas permeability in an in-plane direction in the gas diffusion electrode medium can be reduced. As a result of this, since a sufficient amount of gas to push away liquid water in the flow channel of the bipolar plate can be secured, the flow channel is unlikely to retain liquid water so that plugging can be inhibited. In addition, flooding can be inhibited by facilitating drainage of liquid water in the electrode base material and, further, dry-out can be inhibited by inhibiting water vapor diffusion. Therefore, when the gas diffusion electrode medium is used, high cell performance can be exerted across a wide temperature range from low to high temperatures. Further, the gas diffusion electrode medium also has good mechanical strength, electrical conductivity and thermal conductivity.

DETAILED DESCRIPTION

In the gas diffusion electrode medium, a microporous region is arranged on at least one surface of an electrode base material, and the microporous region contains a flake graphite having an aspect ratio in the range of 50 to 5000. These constituents will be described below.

The electrode base material is required to have high gas diffusibility to allow a gas supplied from a bipolar plate to be diffused into a catalyst, high drainage property to drain liquid water generated by electrochemical reaction to the bipolar plate, and high electrical conductivity to extract generated electric current.

Therefore, it is preferred to use, as the electrode base material, a carbon fiber-containing porous material such as a carbon fiber woven fabric, carbon fiber non-woven fabric or carbon fiber paper sheet, or a porous metal such as a foamed sintered metal, metal mesh or expanded metal and, thereamong, a carbon fiber-containing porous material is preferably used because of its excellent corrosion resistance. It is more preferred to use a substrate on which a carbon fiber paper sheet is bonded with carbide, namely a "carbon paper", because of its excellent mechanical strength. As described below, a substrate on which a carbon fiber paper sheet is bonded with carbide can be normally obtained by impregnating a carbon fiber paper sheet with a resin and then carbonizing the resultant.

Examples of the carbon fiber include polyacrylonitrile (PAN)-based, pitch-based and rayon-based carbon fibers. Thereamong, a PAN-based or pitch-based carbon fiber is preferably used because of its excellent mechanical strength.

The carbon fiber has a monofilament mean diameter of preferably 3 to 20 μm, more preferably 5 to 10 μm. When the mean diameter is 3 μm or larger, since the pore size becomes large, the drainage property is improved and flooding can thus be more inhibited. Meanwhile, when the mean diameter is 20 μm or smaller, since water vapor diffusibility is reduced, dry-out can be more inhibited. Further, it is preferred to use two or more kinds of carbon fibers having different mean diameters since the surface smoothness of the resulting electrode base material can be thereby improved.

The monofilament mean diameter of a carbon fiber is determined by: taking a photograph of the carbon fiber under a microscope such as a scanning electron microscope at a magnification of 1000 times or greater; randomly selecting 30 different monofilaments; measuring their diameters; and then calculating the average thereof. As the scanning electron microscope, S-4800 manufactured by Hitachi, Ltd. or its equivalent product can be used.

The carbon fiber has a monofilament mean length of preferably 3 to 20 mm, more preferably 5 to 15 mm. When the mean length is 3 mm or longer, the electrode base material has excellent mechanical strength, electrical conductivity and thermal conductivity, which is preferred. Meanwhile, when the mean length is 20 mm or shorter, since excellent carbon fiber dispersibility is attained at the time of papermaking, a homogeneous electrode base material can be obtained, which is preferred. The carbon fiber having such a mean length can be obtained by, for example, a method of cutting a continuous carbon fiber to a desired length.

The mean length of a carbon fiber is determined by: taking a photograph of the carbon fiber under a microscope such as a scanning electron microscope at a magnification of 50 times or greater; randomly selecting 30 different monofilaments; measuring their lengths; and then calculating the average thereof. As the scanning electron microscope, S-4800 manufactured by Hitachi, Ltd. or its equivalent product can be used. It is noted that the monofilament mean diameter and mean length of a carbon fiber is usually measured by directly observing the carbon fiber serving as a raw material. However, they may also be measured by observing the electrode base material.

The density of the electrode base material is preferably 0.2 to 0.4 g/cm$^3$, more preferably 0.22 to 0.35 g/cm$^3$, moreover preferably 0.24 to 0.3 g/cm$^3$. When the density is 0.2 g/cm$^3$ or higher, the water vapor diffusibility is small, so that dry-out can be more inhibited. In addition, since the mechanical properties of the electrode base material are improved, an electrolyte membrane and a catalyst layer can be adequately supported thereon. Furthermore, high electrical conductivity is attained and the cell performance is thus improved at both high and low temperatures. Meanwhile, when the density is 0.4 g/cm$^3$ or lower, the drainage property is improved and flooding can thus be more inhibited. An electrode base material having such a density can be obtained by, in the below-described production method, controlling the carbon fiber areal weight of the prepreg, the amount of the resin component to be compounded with respect to the carbon fibers and the thickness of the electrode base material.

A carbon fiber-containing paper sheet impregnated with a resin composition is referred to as "prepreg". Among the above-described measures, it is effective to control the carbon fiber areal weight of the prepreg and the amount of the resin component to be compounded with respect to the carbon fibers. A low-density substrate can be obtained by reducing the carbon fiber areal weight of the prepreg and a high-density substrate can be obtained by increasing the carbon fiber areal weight. Further, a low-density substrate can be obtained by reducing the amount of the resin component to be compounded with respect to the carbon fibers and a high-density substrate can be obtained by increasing the amount of the resin component. Moreover, a low-density substrate can be obtained by increasing the thickness of the electrode base material and a high-density substrate can be obtained by reducing the thickness.

The density of an electrode base material can be determined by dividing the areal weight (weight per unit area) of the electrode base material, which is weighed using an electronic balance, by the thickness of the electrode base material when compressed at a pressure of 0.15 MPa.

The pore size of the electrode base material is preferably 30 to 80 μm, more preferably 40 to 75 μm, moreover preferably 50 to 70 μm. When the pore size is 30 μm or larger, the drainage property is improved and flooding can thus be more inhibited. When the pore size is 80 μm or smaller, high electrical conductivity is attained and the cell performance is thus improved at both high and low temperatures. To design the electrode base material to have a pore size in such a range, it is effective to allow the electrode base material to contain both a carbon fiber having a monofilament mean diameter of 3 μm to 8 μm and a carbon fiber having a monofilament mean diameter of larger than 8 μm.

The pore size of the electrode base material is determined as a peak of a pore size distribution obtained by measuring the pores by a mercury intrusion technique at a pressure of 6 kPa to 414 MPa (pore size: 30 nm to 400 μm). In cases where a plurality of peaks are obtained, the highest peak value is adopted. As a measuring apparatus, AutoPore 9520 manufactured by Shimadzu Corporation or its equivalent product can be used.

The thickness of the electrode base material is preferably 60 to 200 μm. The thickness of the electrode base material is more preferably 70 to 160 μm, and moreover preferably 80 to 110 μm. When the thickness of the electrode base material is 60 μm or more, the electrode base material has high mechanical strength and the handling thereof becomes easy. When the thickness of the electrode base material is 200 μm or less, since the cross-sectional area of the electrode base material is small, the amount of gas required for pushing away liquid water in the flow channel of the bipolar plate can be increased, and the flow channel is unlikely to retain liquid water so that plugging can be more inhibited. In addition, since the drainage path is shortened, flooding can be more inhibited.

The thickness of the electrode base material can be determined using a micrometer under a condition where the electrode base material is compressed at a pressure of 0.15 MPa.

A microporous region is required to be arranged on at least one surface of an electrode base material. The microporous region is required to have high gas diffusibility to allow a gas supplied from a bipolar plate to be diffused into a catalyst, high drainage property to drain liquid water generated by an electrochemical reaction to the bipolar plate, and high electrical conductivity to extract generated electric current. Moreover, the microporous region also has a function of facilitating back-diffusion of a water content to the electrolyte membrane and wetting the electrolyte membrane. Therefore, a porous body containing a conductive filler and a water-repelling material is preferably used for the microporous region.

The microporous region is required to contain a conductive filler and required to use a flake graphite having an aspect ratio of 50 to 5000 as the conductive filler. According to such a flake graphite, the gas permeability in an in-plane direction in the gas diffusion electrode medium can be reduced. As a result of this, since a sufficient amount of gas to push away liquid water in the flow channel of the bipolar plate can be secured, the flow channel is unlikely to retain liquid water so that plugging can be inhibited.

We believe that when the flake graphite which has a large aspect ratio compared to a usual graphite, gas needs to go around the side of the flake graphite, and thus the gas permeability in an in-plane direction in the gas diffusion electrode medium can be significantly reduced. As a result of this, we believe that the amount of gas required to push away liquid water in the flow channel of the bipolar plate can be increased so that plugging can be inhibited. In addition, flooding can be inhibited by facilitating drainage of liquid water in the electrode base material, and further dry-out can be inhibited by inhibiting water vapor diffusion.

When the aspect ratio of the flake graphite is less than 50, gas permeability in an in-plane direction cannot be reduced, and the effect of inhibiting plugging cannot be achieved. Meanwhile, when the aspect ratio is more than 5000, an increase in viscosity in kneading the flake graphite with the water-repelling material to form a paste is large, and therefore a microporous region cannot be formed. The aspect ratio of the flake graphite is more preferably 100 or more and preferably 200 or more. Further, the aspect ratio is more preferably 3000 or less and preferably 1000 or less.

The aspect ratio of the flake graphite means mean particle size (μm)/mean thickness (μm). The mean particle size is a 50% cumulative diameter on a volume basis determined by measuring by use of a laser diffraction particle size distribution analyzer. The mean thickness is determined by: taking a photograph of the flake graphite under a microscope such as a scanning electron microscope or a transmission electron microscope at a magnification of 1000 times or greater; randomly selecting 10 different flake graphites; measuring their thicknesses; and then calculating the average thereof. As the scanning electron microscope, S-4800 manufactured by Hitachi, Ltd. or its equivalent product can be used.

When it is difficult to measure the mean particle size of the flake graphite by using a laser diffraction particle size distribution analyzer, as a substitute for the mean particle size, it is possible to use a value determined by: taking a photograph of the flake graphite under a microscope such as a scanning electron microscope or a transmission electron microscope at a magnification of 1000 times or greater; randomly selecting 10 different flake graphites; measuring their lengths; and then calculating the average thereof. As the scanning electron microscope, S-4800 manufactured by Hitachi, Ltd. or its equivalent product can be used.

The mean thickness of the flake graphite is preferably 0.001 to 0.5 μm, more preferably 0.003 μm or more, moreover preferably 0.005 μm or more. Further, the mean thickness of the flake graphite is more preferably 0.2 μm or less, and moreover preferably 0.1 μm or less. When the mean thickness of the flake graphite is 0.001 μm or more, an increase in viscosity in kneading the flake graphite with the water-repelling material or the like to form a paste is small and, therefore, a microporous region can be easily formed. When the mean thickness is 0.5 μm or less, the gas permeability in an in-plane direction in the gas diffusion electrode medium can be reduced even when the amount of the flake graphite is small. As a result of this, since a sufficient amount of gas to push away liquid water in the flow channel of the bipolar plate can be secured, the flow channel is unlikely to retain liquid water, so that plugging can be more inhibited.

The surface oxygen concentration {O/C} in the flake graphite, which is measured by X-ray photoelectron spectroscopy and is a ratio of the number of atoms of oxygen (O) to that of carbon (C), preferably 0.01 to 0.1, more preferably 0.02 or higher, more preferably 0.03 or higher, moreover preferably 0.04 or higher. Further, the surface oxygen concentration {O/C} is preferably 0.08 or lower, and more preferably 0.06 or lower. When the surface oxygen concentration {O/C} is 0.01 or higher, excellent flake graphite dispersibility is attained, and the gas permeability in an in-plane direction in the gas diffusion electrode medium can be reduced. As a result of this, since a sufficient amount of gas to push away liquid water in the flow channel of the bipolar plate can be secured, the flow channel is unlikely to retain liquid water, so that plugging can be more inhibited. When the surface oxygen concentration {O/C} is 0.1 or lower, the electrical conductivity of the microporous region is high and the cell performance is thus improved at both high and low temperatures.

The surface oxygen concentration {O/C} of the flake graphite is determined according to the following procedure by X-ray photoelectron spectroscopy. The flake graphite is fixed to a sample, support stage made of copper, AlKα 1, 2 are used as an X-ray source, and the inside of a sample chamber is maintained at a pressure of $1 \times 10^{-8}$ Torr. A kinetic energy (K.E.) value of a main peak of $C_{1S}$ is adjusted to 1202 eV as a correction value of a peak associated with charge at the time of measurement. A $C_{1S}$ peak area is determined by drawing a straight base line in the range of 1191 to 1205 eV as K.E. An $O_{1S}$ peak area is determined by drawing a straight base line in the range of 947 to 959 eV as K.E.

The surface oxygen concentration {O/C} is determined as an atomic number ratio calculated from a ratio of the $O_{1S}$ peak area to the $C_{1S}$ peak area using a sensitivity correction value inherent in an apparatus. As an apparatus of X-ray photoelectron spectroscopy, Model ES-200 manufactured by Kokusai Denki Co., Ltd. is used and a sensitivity correction value is set to 1.74.

The microporous region containing a flake graphite can further contain a variety of conductive fillers other than the flake graphite. Among the conductive fillers, a carbon-based conductive filler is preferably used because of its excellent corrosion resistance. Examples of the carbon-based conductive filler include carbon blacks such as furnace blacks, acetylene blacks, lampblacks and thermal blacks; graphites such as scale-like graphite, scaly graphite, amorphous graphite, synthetic graphite and expanded graphite; and linear carbons such as carbon nanotubes, carbon nanofibers, vapor phase growth carbon fibers (VGCF) and milled carbon fibers. Among these, acetylene black is preferably used because of its ease of handling. A mixing mass ratio of the acetylene black to the flake graphite is in the range of preferably 0.1 to 4, more preferably 0.2 to 2, moreover preferably 0.3 to 1. When the mixing mass ratio is 0.1 or more, strength of the microporous region containing the flake graphite and acetylene black is improved, and the microporous region can have excellent durability. On the other hand, when the mixing mass ratio is 4 or less, the gas permeability in an in-plane direction in the gas diffusion electrode medium can be reduced. As a result of this, since a sufficient amount of gas to push away liquid water in the flow channel of the bipolar plate can be secured, the flow channel is unlikely to retain liquid water, so that plugging can be inhibited.

It is preferred to use a water-repelling material in combination with the conductive filler for the microporous region from the viewpoint of facilitating drainage of liquid water. Among these, a fluorine-based polymer is preferably used as the water-repelling material because of its excellent corrosion resistance. Examples of the fluorine-based polymer include polychlorotrifluoroethylene resins (PCTFE), polytetrafluoroethylene (PTFE), polyvinylidene fluoride resins (PVDF), tetrafluoroethylene-hexafluoropropylene copolymers (FEP), tetrafluoroethylene-perfluoroalkylvinyl ether copolymers (PFA) and tetrafluoroethylene-ethylene copolymers (ETFE).

The water-repelling material is compounded in an amount of preferably 1 to 60 parts by mass, more preferably 3 to 50 parts by mass, moreover preferably 5 to 40 parts by mass with respect to 100 parts by mass of the conductive filler including the flake graphite. When the amount of the water-repelling material to be compounded is 1 part by mass or more, the microporous region have excellent mechanical strength, which is preferred. Meanwhile, when the amount of the water-repelling material to be compounded is 60 parts by mass or less, the microporous region have excellent electrical conductivity and thermal conductivity, which is also preferred.

It is possible to use a variety of materials in combination with the conductive filler for the microporous region from the viewpoints of facilitating drainage of liquid water and inhibiting water vapor diffusion. For example, so that the pore size of the microporous region is increased and drainage of liquid water is facilitated, a dissipation material can be used. The dissipation material means a material which disappears by burning off to form voids when the material is heated to 200 to 400° C. to melt the water-repelling material and thereby the water repellency is exerted. Specific examples thereof include particles and fibers of poly(methyl methacrylate), polystyrene or the like.

Porosity of the microporous region is preferably 60 to 85%, more preferably 65 to 80%, moreover preferably 70 to 75%. When the porosity of the microporous region is 60% or higher, the drainage property is improved and flooding can thus be inhibited. When the porosity is 85% or lower, the water vapor diffusibility is small and dry-up can be more inhibited. Furthermore, high electrical conductivity is attained and the cell performance is thus improved at both high and low temperatures. An electrode base material having such a porosity can be obtained by, in the below-described production method, controlling the areal weight of the microporous region, the amount of the conductive filler to be compounded with respect to the water-repelling material and other materials, the kind of the conductive filler, and the thickness of the microporous region. Among these, it is effective to control the amount of the conductive filler to be compounded with respect to the water-repelling material and other materials and the kind of the conductive filler. A high-porosity microporous region can be obtained by reducing the amount of the conductive filler to be compounded with respect to the water-repelling material and other materials, and a low-porosity microporous region can be obtained by increasing the amount of the conductive filler to be compounded with respect to the water-repelling material and other materials. Further, a high-porosity microporous region can be obtained by selecting acetylene black or VGCF as the conductive filler, and a low-porosity microporous region can be obtained by selecting furnace black as the conductive filler.

Porosity of the microporous region is determined by: using a sample for cross section observation prepared by use of an ion beam cross section processing apparatus; taking a photograph of a cross section under a microscope such as a scanning electron microscope at a magnification of 1000 times or greater; measuring an area of voids; and then calculating an area ratio of the voids to an observed area. As the scanning electron microscope, S-4800 manufactured by Hitachi, Ltd. or its equivalent product can be used.

The thickness of the microporous region is preferably 5 to 50 μm, more preferably 10 to 40 μm, and moreover preferably 15 to 30 μm. When the thickness is 5 μm or more, back-diffusion of generated water can be facilitated and the microporous region has a smooth surface. Therefore, when the gas diffusion electrode medium is used in a fuel cell with the microporous region arranged to face the catalyst layer side, the contact electrical resistance between the catalyst layer and the gas diffusion electrode medium is reduced. When the thickness is 50 μm or less, the electrical conductivity of the microporous region is high and the cell performance is thus improved at both high and low temperatures.

While a microporous region is required to be arranged on at least one surface of an electrode base material, the electrode base material is preferably impregnated with a part of the microporous region from the viewpoints that the gas permeability in an in-plane direction in the gas diffusion electrode medium can be reduced, a sufficient amount of gas to push away liquid water in the flow channel of the bipolar plate can be secured, and plugging can be more inhibited.

Further, the microporous region is preferably arranged on both surfaces of an electrode base material from the viewpoints that the gas permeability in an in-plane direction in the gas diffusion electrode medium can be reduced, a sufficient amount of gas to push away liquid water in the flow channel of the bipolar plate can be secured, and plugging can be more inhibited. When the microporous region is arranged on both surfaces of an electrode base material, only the microporous region on one surface may contain a flake graphite having an aspect ratio of 50 to 5000, or the microporous regions on both surfaces may contain a flake graphite having an aspect ratio of 50 to 5000.

Moreover, when the microporous region is arranged on both surfaces of an electrode base material, the areal ratio of the microporous region on one surface is preferably 5 to 70%, more preferably 10 to 60%, moreover preferably 20 to 40%. When the areal ratio of the microporous region is 5% or higher, the flow channel is unlikely to retain liquid water and plugging can be more inhibited, and the water vapor diffusibility is small so that dry-up is more inhibited. When the areal ratio of the microporous region is 70% or lower, since the proportion of the surface of the electrode base material covered with the microporous region is not excessively high, the drainage property is improved so that flooding can be more inhibited.

However, when the areal ratio of the microporous region is smaller, the gas permeability in an in-plane direction tends to be difficult to reduce. Thus, it is more effective to use a flake graphite having an aspect ratio of 50 to 5000 as the conductive filler. The reason for this is probably because gas needs to go around the side of the flake graphite and thus the gas permeability in an in-plane direction in the gas diffusion electrode medium can be significantly reduced.

The term "areal ratio" used herein refers to a proportion (%) of the area covered with the microporous region with respect to the area of the electrode base material on one surface of the gas diffusion electrode medium. The areal ratio is calculated by the following equation:

Areal ratio(%)=Area covered with microporous region/Area of electrode base material×100

The areal ratio can be determined by, for example, the following procedure.

First, using a digital camera, a digital microscope or the like, one surface of the gas diffusion electrode medium is photographed to obtain images thereof. As the digital microscope, a digital HD microscope VH-7000 manufactured by Keyence Corporation or its equivalent product can be used. It is preferred that 10 different spots be randomly selected on the gas diffusion electrode medium and a photograph be taken at each spot for an area of about 3 cm×3 cm. Then, the images thus obtained are binarized into the portion covered with a microporous region and the portion not covered with a microporous region. A variety of binarization methods are available and, when the portion covered with a microporous region can be clearly distinguished from the portion not covered with a microporous region, a method of visually distinguishing these portions may be employed. However, it is preferred to employ a method which utilizes an image processing software or the like. As the image processing software, Adobe Photoshop (registered trademark) manufactured by Adobe System Inc. can be used. On each of the images, the proportion (%) of the area covered with a microporous region with respect to the area of the electrode base material (sum of the area of the portion covered with a microporous region and the area of the portion not covered with a microporous region) is calculated and the average thereof is determined.

Meanwhile, when the areal ratio is measured after the gas diffusion electrode medium is incorporated into a membrane electrode assembly or the like, the areal ratio is determined by the following procedure. First, under a microscope such as a scanning electron microscope, 100 different spots are randomly selected from a cross section of the gas diffusion electrode medium and each spot is photographed at a magnification of about 40 times to obtain images. As the scanning electron microscope, S-4800 manufactured by Hitachi, Ltd. or its equivalent product can be used. Then, on each of the images thus obtained, the proportion (%) of the area of the electrode base material surface covered with the microporous region is measured and the average thereof is determined.

It is preferred to arrange a microporous region having an areal ratio of 5 to 70% on the bipolar plate side from the viewpoints that the gas permeability in an in-plane direction in the gas diffusion electrode medium can be reduced, a sufficient amount of gas to push away liquid water in the flow channel of the bipolar plate can be secured, and the drainage property can be improved and flooding can be inhibited while plugging being inhibited.

It is preferred that the microporous region form a pattern of microporous region on the electrode base material. The term "pattern-like" or "pattern" refers to a design which is repeated with a certain interval. It is preferred that an area of 100 cm$^2$ or smaller contain such repeating intervals and it is more preferred that an area of 10 cm$^2$ or smaller contain such repeating intervals. By making the interval small, the in-plane variation of the performances such as electrical conductivity and drainage property can be reduced. When plural gas diffusion electrode media are prepared, the presence or absence of such an interval may be verified by comparing the thus obtained sheets with each other. Examples of the pattern include a lattice, stripe, concentric circle, island pattern and the like.

It is preferred to arrange a side of a microporous region, on which a pattern is formed, on the bipolar plate side from the viewpoints that the gas permeability in an in-plane direction in the gas diffusion electrode medium can be reduced, a sufficient amount of gas to push away liquid water in the flow channel of the bipolar plate can be secured, and the drainage property can be improved and flooding can be inhibited while plugging being inhibited.

Next, a method suitable to obtain the gas diffusion electrode medium will be concretely described.

Paper Sheet and Production Method Thereof

To obtain a carbon fiber-containing paper sheet, for example, a wet papermaking method in which a carbon fiber-containing paper sheet is produced by dispersing carbon fibers in a liquid or a dry papermaking method in which a carbon fiber-containing paper sheet is produced by dispersing carbon fibers in the air is employed. Thereamong, a wet papermaking method is preferably employed because of its excellent productivity.

For the purpose of improving the drainage property and gas diffusibility of the electrode base material, carbon fibers can be mixed with an organic fiber to produce a paper sheet. As the organic fiber, for example, a polyethylene fiber, a vinylon fiber, a polyacetal fiber, a polyester fiber, a polyamide fiber, a rayon fiber or an acetate fiber can be used.

Further, for the purpose of improving the shape-retaining property and ease of handling of the paper sheet, an organic polymer can be incorporated as a binder. As the organic polymer, for example, polyvinyl alcohol, polyvinyl acetate, polyacrylonitrile or cellulose can be used.

To maintain the in-plane electrical conductivity and thermal conductivity to be isotropic, the paper sheet is preferably in the form of a sheet in which carbon fibers are randomly dispersed in a two-dimensional plane.

Although the pore size distribution obtained for the paper sheet is influenced by the content and dispersion state of the carbon fibers, the pores can be formed at a size of about 20 to 500 μm.

The paper sheet has a carbon fiber areal weight of preferably 10 to 60 g/m$^2$, more preferably 20 to 50 g/m$^2$. When the carbon fiber areal weight is 10 g/m$^2$ or greater, the electrode base material has excellent mechanical strength, which is preferred. Meanwhile, when the carbon fiber areal weight is 60 g/m$^2$ or less, the electrode base material has excellent gas diffusibility and drainage property, which is also preferred. When a plurality of paper sheets are bonded, it is preferred that the post-bonding carbon fiber areal weight be in the above-described range.

The carbon fiber areal weight in the electrode base material can be determined by retaining a paper sheet cut into a 10-cm square under a nitrogen atmosphere in a 450° C. electric furnace for 15 minutes to remove organic matters, and then dividing the weight of the resulting residue obtained by removal of organic matters by the area of the paper sheet (0.1 m$^2$).

Impregnation with Resin Composition

As a method of impregnating a carbon fiber-containing paper sheet with a resin composition, for example, a method of dipping a paper sheet into a resin composition-containing solution, a method of coating a paper sheet with a resin composition-containing solution or a method of laminating and transferring a film composed of a resin composition onto a paper sheet are employed. Thereamong, a method of dipping a paper sheet into a resin composition-containing solution is preferably employed because of its excellent productivity.

The resin composition is preferably one which is carbonized by baking to yield an electrically conductive carbide. The term "resin composition" refers to a resin component to which a solvent or the like is added as required. The term "resin component" refers to a component which contains a resin such as a thermosetting resin and, as required, an additive(s) such as a carbon-based filler and a surfactant.

More particularly, it is preferred that the carbonization yield of the resin component contained in the resin composition be 40% by mass or higher. When the carbonization yield is 40% by mass or higher, the electrode base material attains excellent mechanical properties, electrical conductivity and thermal conductivity, which is preferred.

Examples of the resin constituting the resin component include thermosetting resins such as phenolic resins, epoxy resins, melamine resins and furan resins. Thereamong, a phenolic resin is preferably used because of its high carbonization yield. Further, as an additive to be added to the resin component as required, a carbon-based filler can be added for the purpose of improving the mechanical properties, electrical conductivity and thermal conductivity of the electrode base material. As the carbon-based filler, for example, a carbon black, a carbon nanotube, a carbon nanofiber, a milled carbon fiber or graphite can be used.

As the resin composition, a resin composition obtained by the above-described constitution can be used as is, or the resin composition containing a variety of solvents, as required, for the purpose of enhancing the impregnation of the paper sheet with the resin composition may be used. As the solvent, for example, methanol, ethanol or isopropyl alcohol can be used.

It is preferred that the resin composition be in a liquid form under a condition of 25° C. and 0.1 MPa. When the resin composition is in a liquid form, impregnation of a paper sheet with the resin composition is excellent so that the electrode base material has excellent mechanical properties, electrical conductivity and thermal conductivity, which is preferred.

The paper sheet is impregnated with a resin component in an amount of preferably 30 to 400 parts by mass, more preferably 50 to 300 parts by mass, with respect to 100 parts by mass of the carbon fibers. When the impregnation amount of a resin component is 30 parts by mass or more, the electrode base material has excellent mechanical properties, electrical conductivity and thermal conductivity, which is preferred. Meanwhile, when the impregnation amount of a resin component is 400 parts by mass or less, the electrode base material has excellent gas diffusibility, which is also preferred.

Lamination and Heat Treatment

After formation of a prepreg in which a carbon fiber-containing paper sheet is impregnated with a resin composition but, before carbonization, the thus obtained prepreg can be laminated and/or heat-treated.

To allow the electrode base material to have a prescribed thickness, a plurality of prepregs can be laminated. In this case, a plurality of prepregs having the same properties can be laminated, or a plurality of prepregs having different properties can be laminated. Specifically, it is possible to laminate a plurality of prepregs that are different in terms of, for example, the mean diameter and mean length of the carbon fibers, the carbon fiber areal weight of the paper sheet or the impregnation amount of a resin component.

To increase the viscosity of the resin composition or partially cross-link the resin composition, the prepreg can be subjected to heat-treating. As a heat-treating method, for example, a method of blowing hot air against the prepreg, a method of heating the prepreg by sandwiching it between hot plates of a press apparatus or a method of heating the prepreg by sandwiching it between continuous belts can be employed.

Carbonization

After impregnating the carbon fiber-containing paper sheet with the resin composition, the resulting paper sheet is baked in an inert atmosphere to perform carbonization. For this baking, a batch-type heating furnace or a continuous heating furnace can be used. Further, the inert atmosphere can be achieved by allowing an inert gas such as nitrogen gas or argon gas to flow in the furnace.

The highest temperature in the baking is preferably 1300 to 3000° C., more preferably 1700 to 3000° C., moreover preferably 1900 to 3000° C. When the highest temperature is 1300° C. or higher, carbonization of the resin component is facilitated so that the resulting electrode base material attains excellent electrical conductivity and thermal conductivity, which is preferred. Meanwhile, when the highest temperature is 3000° C. or lower, the operating cost of the heating furnace is reduced, which is also preferred.

It is preferred that the temperature ramp rate in the baking be 80 to 5000° C./min. When the temperature ramp rate is 80° C./min or higher, excellent productivity is preferably attained. Meanwhile, when the temperature ramp rate is 5000° C./min or lower, since carbonization of the resin component slowly proceeds and a dense structure is formed, the resulting electrode base material attains excellent electrical conductivity and thermal conductivity, which is preferred.

A carbon fiber-containing paper sheet impregnated with a resin composition and then carbonized is referred to as "baked carbon fiber paper".

Water Repellent Treatment

To improve the drainage property, the baked carbon fiber paper is preferably subjected to a water repellent treatment. The water repellent treatment can be performed by coating the baked carbon fiber paper with a water-repelling material and heat-treating the water-repelling material. As the water-repelling material, a fluorine-based polymer is preferably used because of its excellent corrosion resistance. Examples of the fluorine-based polymer include polychlorotrifluoroethylene resins (PCTFE), polytetrafluoroethylene (PTFE), polyvinylidene fluoride resins (PVDF), tetrafluoroethylene-hexafluoropropylene copolymers (FEP), tetrafluoroethylene-perfluoroalkylvinyl ether copolymers (PFA) and tetrafluoroethylene-ethylene copolymers (ETFE). The amount of the water-repelling material for coating is preferably 1 to 50 parts by mass, more preferably 2 to 40 parts by mass, and moreover preferably 3 to 30 parts by mass with respect to 100 parts by mass of the baked carbon fiber paper. When the amount of the water-repelling material for coating is 1 part by mass or more, the resulting electrode base material has excellent drainage property, which is preferred. Meanwhile, when the amount of the water-repelling material for coating is 50 parts by mass or less, the resulting electrode base material has excellent electrical conductivity, which is also preferred.

A baked carbon fiber paper subjected to a water repellent treatment as required is referred to as "electrode base material". In addition, when the baked carbon fiber paper is not subjected to a water repellent treatment, the baked carbon fiber paper and the "electrode base material" are the same.

Formation of Microporous Region

The microporous region can be formed by applying a carbon coating liquid containing at least a flake graphite having an aspect ratio in the range of 50 to 5000 onto at least one surface of the electrode base material.

The carbon coating liquid may contain a dispersion medium such as water or an organic solvent or may contain a dispersant aid such as a surfactant. As the dispersion medium, water is preferred, and it is more preferred that a nonionic surfactant be used as the dispersant aid.

The coating of the electrode base material with the carbon coating liquid can be carried out by using a variety of commercially available coating apparatuses. As a coating method, for example, screen printing, rotary screen printing, spraying, intaglio printing, gravure printing, die coating, bar coating or blade coating can be employed. However, screen printing (including rotary screen printing) or gravure printing is preferred in the pattern coating performed for the formation of a pattern of the microporous region. The above-described coating methods are presented for the illustration purpose only and the coating method is not necessarily limited thereto.

After coating the electrode base material with the carbon coating liquid, a coating material is preferably dried at a temperature of 80 to 120° C. That is, it is preferred that the resulting electrode base material coated with the coating material be placed in a drying furnace whose temperature is set at 80 to 120° C. and dried for 5 to 30 minutes. The drying air flow may be determined as appropriate. However, rapid drying is not desirable since it may induce generation of microcracks on the surface. After the drying, the resulting electrode base material coated with the coating material is preferably placed in a muffle furnace, a baking furnace or a high-temperature drying furnace, and heated at 300 to 400° C. for 5 to 20 minutes to melt the water-repelling material, thereby forming the microporous region with the use of a conductive filler as a binder.

Preparation of Membrane Electrode Assembly, Fuel Cell

A membrane electrode assembly can be constituted by joining the above-described gas diffusion electrode medium on at least one surface of a solid polymer electrolyte membrane having a catalyst layer on both sides.

The fuel cell is constituted by arranging a bipolar plate on both sides of the above-described membrane electrode assembly. Usually, a polymer electrolyte fuel cell is constituted of laminating a plurality of such membrane electrode assemblies that are sandwiched between bipolar plates with a gasket interposed between the assembly and the bipolar plate. The catalyst layer is composed of a layer comprising a solid polymer electrolyte and a carbon-supported catalyst. As the catalyst, platinum is usually used. In a fuel cell in which a carbon monoxide-containing reformed gas is fed to the anode side, it is preferred to use platinum and ruthenium as catalysts of the anode side. As the solid polymer electrolyte, it is preferred to use a perfluorosulfonic acid-based polymer material having high proton conductivity, oxidation resistance and heat resistance. The constitutions of such fuel cell unit and fuel cell are themselves well known.

EXAMPLES

Hereinafter, our mediums and methods will be concretely described by way of examples thereof and comparative examples. The methods of preparing the materials and the electrode base materials and the method of preparing the gas diffusion electrode media used in the examples and comparative examples, and the performance evaluation method of fuel cell are described below.

Materials

A: Conductive filler (flake graphite having an aspect ratio in the range of 50 to 5000)

"xGnP" (Registered Trademark) grade M (flake graphite, manufactured by XG Sciences Inc., mean particle size: 5 μm, mean thickness: 0.006 μm, aspect ratio: 830, surface oxygen concentration {O/C}: 0.04)

UP-5N (flake graphite, manufactured by Nippon Graphite Industries, Co., Ltd., mean particle size: 7 μm, mean thickness: 0.05 μm, aspect ratio: 140, surface oxygen concentration {O/C}: 0.03)

BSP-5AK (flake graphite, manufactured by Chuetsu Graphite Works Co., Ltd., mean particle size: 5 μm, mean thickness: 0.1 μm, aspect ratio: 50, surface oxygen concentration {O/C}: 0.02)

Heat-treated BSP-5AK ((BSP-5AK heat-treated at 500° C. for 1 hour in a nitrogen atmosphere using a muffle furnace), mean particle size: 5 μm, mean thickness: 0.1 μm, aspect ratio: 50, surface oxygen concentration {O/C}: less than 0.01)

B. Other Conductive Fillers

DENKA BLACK (Registered Trademark) (acetylene black, manufactured by DENKI KAGAKU KOGYO KABUSHIKI KAISHA, mean particle size: 0.035 μm, aspect ratio: 1)

BF-5A (scale-like graphite, manufactured by Chuetsu Graphite Works Co., Ltd., mean particle size: 5 μm, mean thickness: 0.25 μm, aspect ratio: 20, surface oxygen concentration {O/C}: less than 0.01)

BF-18A (scale-like graphite, manufactured by Chuetsu Graphite Works Co., Ltd., mean particle size: 18 μm, mean thickness: 0.45 μm, aspect ratio: 40, surface oxygen concentration {O/C}: less than 0.01)

C. Water-repelling Material

"POLYFLON" (registered trademark) D-1E (PTFE resin, manufactured by Daikin Industries, Ltd.)

D. Surfactant

"TRITON" (registered trademark) X-100 (nonionic surfactant, manufactured by Nacalai Tesque, Inc.)

Preparation of Electrode Base Material

Polyacrylonitrile-based carbon fibers "TORAYCA (registered trademark)" T300 manufactured by Toray Industries, Inc. (mean carbon fiber diameter: 7 μm) were cut at a mean length of 12 mm and dispersed in water to continuously prepare a paper sheet by a wet papermaking method. Further, the thus obtained paper sheet was coated with a 10% by mass aqueous solution of polyvinyl alcohol as a binder and then the resultant was dried to prepare a paper sheet having a carbon fiber areal weight of 15.5 g/m$^2$. The amount of the polyvinyl alcohol for coating was 22 parts by mass with respect to 100 parts by mass of the paper sheet.

As a thermosetting resin, a carbon-based filler and a solvent, a resin obtained by mixing a resol-type phenolic resin and a novolak-type phenolic resin at a weight ratio of 1:1, a scale-like graphite (mean particle size: 5 μm) and methanol, respectively, were mixed at a ratio, thermosetting resin/carbon-based filler/solvent=10 parts by mass/5 parts by mass/85 parts by mass, and the resulting mixture was stirred for 1 minute using an ultrasonic dispersion apparatus to obtain a uniformly dispersed resin composition.

The paper sheet was cut into a size of 15 cm×12.5 cm and dipped into the thus obtained resin composition filled in an aluminum tray, and the paper sheet was impregnated with the resin composition so that the amount of the resin component (thermosetting resin+carbon-based filler) was 130 parts by mass with respect to 100 parts by mass of the carbon fibers. The resulting paper sheet was subsequently dried by heating at 100° C. for 5 minutes to prepare a prepreg. Then, the thus obtained prepreg was heat-treated at 180° C. for 5 minutes while being pressed by a pressing machine with flat plates. When the prepreg was pressed, the space between the upper and lower press plates was adjusted by arranging a spacer in the pressing machine such that the heat-treated prepreg had a thickness of 130 μm.

The thus heat-treated prepreg was introduced into a heating furnace having the highest temperature of 2400° C., in which a nitrogen gas atmosphere was maintained, to obtain a baked carbon fiber paper.

Then, 5 parts by mass of a PTFE resin was added to 95 parts by mass of the thus obtained baked carbon fiber, paper and the resultant was dried by heating at 100° C. for 5 minutes to prepare an electrode base material of 100 μm in thickness.

Formation of Microporous Region

Catalyst Side

A catalyst side of the electrode base material was coated with a carbon coating liquid in a planar form, with a die coater, and the resultant was heated at 120° C. for 10 minutes and at 380° C. for 20 minutes to form a planar microporous region. The carbon coating liquid used herein was formed by mixing a conductive filler and a water-repelling material to have each compositional ratio shown in Tables 1 to 3, adding a surfactant in an amount of 200 parts by weight with respect to 100 parts by weight of the conductive filler, and adjusting the resultant by purified water such that a solid content was 25 parts by weight. Since the surfactant and purified water were removed by heating, a compositional ratio of the microporous region was each compositional ratio shown in Tables 1 to 3. The compositional ratio is presented in parts by weight.

Bipolar Plate Side

Using a screen printing plate masked with a resin except for a lattice-shaped pattern part configured by straight lines having a line width of 0.5 mm and a line space of 2 mm, a lattice-shaped pattern-like carbon coating liquid part was formed on a bipolar plate side of the thus obtained electrode base material and heated at 120° C. for 10 minutes and at 380° C. for 20 minutes to form a microporous region. The carbon coating liquid used herein was formed by mixing a conductive filler and a water-repelling material so as to have each compositional ratio shown in Tables 1 to 3, adding a surfactant in an amount of 200 parts by weight with respect to 100 parts by weight of the conductive filler, and adjusting the resultant by purified water such that a solid content was 25 parts by weight. Since the surfactant and the purified water were removed by heating, a compositional ratio of the microporous region was each compositional ratio shown in Tables 1 to 3. The compositional ratio is presented in terms of parts by weight.

Evaluation of Cell Performance of Polymer Electrolyte Fuel Cell

A catalyst paste was prepared by sequentially adding 1.00 g of carbon-supported platinum catalyst (manufactured by Tanaka Kikinzoku Kogyo K.K., platinum carrying amount: 50% by mass), 1.00 g of purified water, 8.00 g of "NAFION" (registered trademark) solution (manufactured by Aldrich Chemical Co., "NAFION" (registered trademark), 5.0% by mass) and 18.00 g of isopropyl alcohol (manufactured by Nacalai Tesque, Inc.) in the order mentioned.

Then, a "NAFLON" (registered trademark) PTFE tape "TOMBO" (registered trademark) No. 9001 (manufactured by Nichias Corporation), which was cut into a size of 7 cm×7 cm, was coated with the thus obtained catalyst paste using a spray and the resultant was dried at room temperature to prepare a PTFE sheet provided with a catalyst layer having a platinum amount of 0.3 mg/cm$^2$. Subsequently, a solid polymer electrolyte membrane, "NAFION" (registered trademark) NRE-211CS (manufactured by DuPont Co.), was cut into a size of 10 cm×10 cm and sandwiched between two PTFE sheets provided with a catalyst layer. The resultant was pressed at a temperature of 130° C. for 5 minutes using a pressing machine with flat plates at a pressure of 5 MPa, thereby transferring the respective catalyst layers to the solid polymer electrolyte membrane. After pressing, the PTFE sheets were peeled to prepare a solid polymer electrolyte membrane with a catalyst layer.

Next, the thus obtained solid polymer electrolyte membrane with a catalyst layer was sandwiched between two gas diffusion electrode media cut into a size of 7 cm×7 cm and the resultant was pressed at a temperature of 130° C. for 5 minutes using a pressing machine with flat plates at a pressure of 3 MPa, thereby preparing a membrane electrode assembly. It is noted here that the gas diffusion electrode media were each arranged such that the surface having the microporous region was in contact with the catalyst layer.

The thus obtained membrane electrode assembly was incorporated into a unit cell for fuel cell evaluation and the voltage in varying the current density was measured. As a bipolar plate, a serpentine-type bipolar plate having one flow channel of 1.5 mm in channel width, 1.0 mm in channel depth and 1.1 mm in rib width was used. Further, the evaluation was carried out with hydrogen pressurized at 210 kPa and air pressurized at 140 kPa fed to the anode side and the cathode side, respectively. It is noted here that the hydrogen and air were both humidified using a humidification pot whose temperature was set at 70° C. The stoichiometries of the hydrogen and atmospheric oxygen were set to 80% and 67%, respectively.

First, the output voltage was measured at an operating temperature of 65° C. and a humidification temperature of 70° C. and at a current density of 2.2 A/cm² and the measured value was used as an index of the anti-flooding characteristic (low-temperature performance). Further, the number of reductions in the output voltage was counted when the evaluation unit cell was retained for 30 minutes at an operating temperature of 65° C. and a humidification temperature of 70° C. and at a current density of 2.2 A/cm², and the thus obtained value was used as an index of the anti-plugging characteristic. That is, the number of times when the output voltage was reduced to 0.2 V or lower was counted in a period of 30 minutes and the times when the counted number was 7 or more, 5 or 6, 3 or 4, and 2 or less were rated as C, B, A and S, respectively. Then, the humidification temperature was set at 70° C. and the current density was set at 1.2 A/cm² and, while repeating a cycle of, from an operating temperature of 80° C., retaining the operating temperature for 5 minutes and then increasing it by 2° C. over a period of 5 minutes, the output voltage was measured to determine the upper limit temperature at which the evaluation unit cell was able to generate power, and the thus obtained value was used as an index of the anti-dry-out characteristic (high-temperature performance).

Examples 1 and 2

Each gas diffusion electrode medium, which had, on a catalyst side of the electrode base material, a planar microporous region containing a flake graphite having a high aspect ratio and acetylene black, as shown in Table 1, was obtained according to the methods described in "Preparation of Electrode Base Material" and "Formation of Microporous Region." As a result of evaluating the cell performance by using the gas diffusion electrode medium, both of Examples 1 and 2 exhibited good anti-plugging characteristic. The output voltages of Examples 1 and 2 were 0.36 V and 0.35 V, respectively (operation temperature: 65° C., humidification temperature: 70° C., current density: 2.2 A/cm²), the upper limit temperatures of Examples 1 and 2 were 91° C. and 92° C., respectively (humidification temperature: 70° C., current density: 1.2 A/cm²), and, as shown in Table 1, the anti-flooding characteristic and the anti-dry-out characteristic were both good.

Examples 3 and 5

Each gas diffusion electrode medium, which had, on a catalyst side of the electrode base material, a planar microporous region containing acetylene black and had, on a bipolar plate side, a lattice-shaped pattern-like microporous region containing a flake graphite having a high aspect ratio and acetylene black, as shown in Table 1, was obtained according to the methods described in "Preparation of Electrode Base Material" and "Formation of Microporous Region." As a result of evaluating the cell performance by using the gas diffusion electrode medium, all of Examples 3 to 5 exhibited extremely good anti-plugging characteristic. The output voltages of Examples 3, 4 and 5 were 0.35 V, 0.34 V and 0.35 V, respectively (operation temperature: 65° C., humidification temperature: 70° C., current density: 2.2 A/cm²), the upper limit temperatures of Examples 3, 4 and 5 were 92° C., 92° C. and 91° C., respectively (humidification-temperature: 70° C., current density: 1.2 A/cm²), and, as shown in Table 1, the anti-flooding characteristic and the anti-dry-out characteristic were both good.

Example 6

A gas diffusion electrode medium, which had, on a catalyst side of the electrode base material, a planar microporous region containing a flake graphite having a high aspect ratio and acetylene black and had, on a bipolar plate side, a lattice-shaped pattern-like microporous region containing a flake graphite having a high aspect ratio and acetylene black, as shown in Table 1, was obtained according to the methods described in "Preparation of Electrode Base Material" and "Formation of Microporous Region." As a result of evaluating the cell performance by using the gas diffusion electrode medium, the anti-plugging characteristic was extremely good. The output voltage was 0.33 V (operation temperature: 65° C., humidification temperature: 70° C., current density: 2.2 A/cm²) and the upper limit temperature was 92° C. (humidification temperature: 70° C., current density: 1.2 A/cm²) and, as shown in Table 1, the anti-flooding characteristic and the anti-dry-out characteristic were both good.

TABLE 1

| | | | Example 1 | Example 2 | Example 3 | Example 4 | Example 5 | Example 6 |
|---|---|---|---|---|---|---|---|---|
| Microporous Region [Catalyst Layer Side] | Composition | "xGnP" (Registered Trademark) grade M(Aspect Ratio: 830)(Surface Oxygen Concentration {O/C}: 0.04) | 25 | 50 | — | — | — | 25 |
| | | Acetylene Black | 75 | 50 | 100 | 100 | 100 | 75 |
| | | PTFE Resin | 33 | 33 | 33 | 33 | 33 | 33 |
| | Shape | | planar | planar | planar | planar | planar | planar |
| Microporous Region [Bipolar Plate Side] | Composition | "xGnP" (Registered Trademark) grade M(Aspect Ratio: 830)(Surface Oxygen Concentration {O/C}: 0.04) | — | — | 25 | 50 | — | 50 |
| | | UP-5N (Aspect Ratio: 140)(Surface Oxygen Concentration {O/C}: 0.03) | — | — | — | — | 50 | — |
| | | Acetylene Black | — | — | 75 | 50 | 50 | 50 |
| | | PTFE Resin | — | — | 33 | 33 | 33 | 33 |
| | Shape | | — | — | lattice | lattice | lattice | lattice |
| Anti-flooding Characteristic | Output Voltage [V] | | 0.36 | 0.35 | 0.35 | 0.34 | 0.35 | 0.33 |

TABLE 1-continued

| | | Example 1 | Example 2 | Example 3 | Example 4 | Example 5 | Example 6 |
|---|---|---|---|---|---|---|---|
| Anti-plugging Characteristic | Evaluation of Voltage Reduction Frequency | A | A | S | S | S | S |
| Anti-dry-out Characteristic | Upper Limit Temperature [° C.] | 91 | 92 | 92 | 92 | 91 | 92 |

Example 7

A gas diffusion electrode medium, which had, on a catalyst side of the electrode base material, a planar microporous region containing a flake graphite having a high aspect ratio and acetylene black, as shown in Table 2, was obtained according to the methods described in "Preparation of Electrode Base Material" and "Formation of Microporous Region." As a result of evaluating the cell performance by using the gas diffusion electrode medium, the anti-plugging characteristic was good. The output voltage was 0.36 V (operation temperature: 65° C., humidification temperature: 70° C., current density: 2.2 A/cm$^2$), the upper limit temperature was 90° C. (humidification temperature: 70° C., current density: 1.2 A/cm$^2$) and, as shown in Table 2, the anti-flooding characteristic and the anti-dry-out characteristic were both good.

Example 8

A gas diffusion electrode medium, which had, on a catalyst side of the electrode base material, a planar microporous region containing a flake graphite having a high aspect ratio and acetylene black, was obtained in the same manner as in Example 7 except that heat-treated BSP-5AK (flake graphite) which was heat-treated at 500° C. for 1 hour in a nitrogen atmosphere using a muffle furnace was used. The surface oxygen concentration {O/C} of this flake graphite was less than 0.01. As a result of evaluating the cell performance by using the gas diffusion electrode medium, the anti-plugging characteristic was relatively good. The output voltage was 0.35 V (operation temperature: 65° C., humidification temperature: 70° C., current density: 2.2 A/cm$^2$), the upper limit temperature was 90° C. (humidification temperature: 70° C., current density: 1.2 A/cm$^2$) and, as shown in Table 2, the anti-flooding characteristic and the anti-dry-out characteristic were both good.

Example 9

A gas diffusion electrode medium, which had, on a catalyst side of the electrode base material, a planar microporous region containing acetylene black and had, on a bipolar plate side, a lattice-shaped pattern-like microporous region containing a flake graphite having a high aspect ratio and acetylene black, as shown in Table 2, was obtained according to the methods described in "Preparation of Electrode Base Material" and "Formation of Microporous Region." As a result of evaluating the cell performance by using the gas diffusion electrode medium, the anti-plugging characteristic was extremely good. The output voltage was 0.35 V (operation temperature: 65° C., humidification temperature: 70° C., current density: 2.2 A/cm$^2$), the upper limit temperature was 91° C. (humidification temperature: 70° C., current density: 1.2 A/cm$^2$) and, as shown in Table 2, the anti-flooding characteristic and the anti-dry-out characteristic were both good.

Example 10

A gas diffusion electrode medium, which had, on a catalyst side of the electrode base material, a planar microporous region containing acetylene black and had, on a bipolar plate side, a lattice-shaped pattern-like microporous region containing a flake graphite having a high aspect ratio and acetylene black, was obtained in the same manner as in Example 9 except that heat-treated BSP-5AK (flake graphite) which was heat-treated at 500° C. for 1 hour in a nitrogen atmosphere using a muffle furnace was used. As a result of evaluating the cell performance by using the gas diffusion electrode medium, the anti-plugging characteristic was good. The output voltage was 0.35 V (operation temperature: 65° C., humidification temperature: 70° C., current density: 2.2 A/cm$^2$), the upper limit temperature was 91° C. (humidification temperature: 70° C., current density: 1.2 A/cm$^2$) and, as shown in Table 2, the anti-flooding characteristic and the anti-dry-out characteristic were both good.

TABLE 2

| | | | Example 7 | Example 8 | Example 9 | Example 10 |
|---|---|---|---|---|---|---|
| Microporous Region [Catalyst Layer Side] | Composition | BSP-5AK (Aspect Ratio: 50)(Surface Oxygen Concentration {O/C}: 0.02) | 25 | — | — | — |
| | | Heat-treated BSP-5AK (Aspect Ratio: 50) (Surface Oxygen Concentration {O/C}: less than 0.01) | — | 25 | — | — |
| | | Acetylene Black | 75 | 75 | 100 | 100 |
| | | PTFE Resin | 33 | 33 | 33 | 33 |
| | Shape | | planar | planar | planar | planar |

TABLE 2-continued

|  |  |  | Example 7 | Example 8 | Example 9 | Example 10 |
|---|---|---|---|---|---|---|
| Microporous Region [Bipolar Plate Side] | Composition | BSP-5AK (Aspect Ratio: 50)(Surface Oxygen Concentration {O/C}: 0.02) | — | — | 50 | — |
|  |  | Heat-treated BSP-5AK (Aspect Ratio: 50) (Surface Oxygen Concentration {O/C}: less than 0.01) | — | — | — | 50 |
|  |  | Acetylene Black | — | — | 50 | 50 |
|  |  | PTFE Resin | — | — | 33 | 33 |
|  | Shape |  | — | — | lattice | lattice |
| Anti-flooding Characteristic | Output Voltage [V] |  | 0.36 | 0.35 | 0.35 | 0.35 |
| Anti-plugging Characteristic | Evaluation of Voltage Reduction Frequency |  | A | B | S | A |
| Anti-dry-out Characteristic | Upper Limit Temperature [° C.] |  | 90 | 90 | 91 | 91 |

Comparative Example 1

A gas diffusion electrode medium, which had, on a catalyst side of the electrode base material, a planar microporous region containing acetylene black, as shown in Table 3, was obtained according to the methods described in "Preparation of Electrode Base Material" and "Formation of Microporous Region." As a result of evaluating the cell performance of the gas diffusion electrode medium, the anti-plugging characteristic was poor. The output voltage was 0.35 V (operation temperature: 65° C., humidification temperature: 70° C., current density: 2.2 A/cm$^2$) and the anti-flooding characteristic was good. However, the upper limit temperature was 88° C. (humidification temperature: 70° C., current density: 1.2 A/cm$^2$) and the anti-dry-out characteristic was poor.

Comparative Examples 2 and 3

Each gas diffusion electrode medium, which had, on a catalyst side of the electrode base material, a planar microporous region containing a scale-like graphite and acetylene black, as shown in Table 3, was obtained according to the methods described in "Preparation of Electrode Base Material" and "Formation of Microporous Region." As a result of evaluating the cell performance of the gas diffusion electrode medium, both of Comparative Examples 2 and 3 exhibited poor anti-plugging characteristic. The output voltages of Comparative Examples 2 and 3 were 0.34 V and 0.34 V, respectively (operation temperature: 65° C., humidification temperature: 70° C., current density: 2.2 A/cm$^2$), and the anti-flooding characteristic was good. However, the upper limit temperatures of Comparative Examples 2 and 3 were 88° C. and 89° C., respectively (humidification temperature: 70° C., current density: 1.2 A/cm$^2$), and the anti-dry-out characteristic was poor.

Comparative Example 4

A gas diffusion electrode medium, which had, on a catalyst side of the electrode base material, a planar microporous region containing acetylene black and had, on a bipolar plate side, a lattice-shaped pattern-like microporous region containing acetylene black, as shown in Table 3, was obtained according to the methods described in "Preparation of Electrode Base Material" and "Formation of Microporous Region." As a result of evaluating the cell performance of the gas diffusion electrode medium, the anti-plugging characteristic was relatively good. The output voltage was 0.34 V (operation temperature: 65° C., humidification temperature: 70° C., current density: 2.2 A/cm$^2$) and the anti-flooding characteristic was good. However, the upper limit temperature was 88° C. (humidification temperature: 70° C., current density: 1.2 A/cm$^2$) and the anti-dry-out characteristic was poor.

Comparative Examples 5 and 6

Each gas diffusion electrode medium, which had, on a catalyst side of the electrode base material, a planar microporous region containing acetylene black and had, on a bipolar plate side, a lattice-shaped pattern-like microporous region containing a scale-like graphite and acetylene black, as shown in Table 3, was obtained according to the methods described in "Preparation of Electrode Base Material" and "Formation of Microporous Region." As a result of evaluating the cell performance of the gas diffusion electrode medium, both of Comparative Examples 5 and 6 exhibited relatively good anti-plugging characteristic. The output voltages of Comparative Examples 5 and 6 were 0.33 V and 0.33 V, respectively (operation temperature: 65° C., humidification temperature: 70° C., current density: 2.2 A/cm$^2$), and the anti-flooding characteristic was good. However, the upper limit temperatures of Comparative Examples 5 and 6 were 89° C. and 89° C., respectively (humidification temperature: 70° C., current density: 1.2 A/cm$^2$), and the anti-dry-out characteristic was poor.

TABLE 3

|  |  |  | Comparative Example 1 | Comparative Example 2 | Comparative Example 3 | Comparative Example 4 | Comparative Example 5 | Comparative Example 6 |
|---|---|---|---|---|---|---|---|---|
| Microporous Region [Catalyst Layer Side] | Composition | BF-5A (Aspect Ratio: 20)(Surface Oxygen Concentration {O/C}: less than 0.01) | — | 25 | — | — | — | — |
|  |  | BF-18A (Aspect Ratio: 40)(Surface Oxygen Concentration {O/C}: less than 0.01) | — | — | 25 | — | — | — |
|  |  | Acetylene Black | 100 | 75 | 75 | 100 | 100 | 100 |
|  |  | PTFE Resin | 33 | 33 | 33 | 33 | 33 | 33 |
|  | Shape |  | planar | planar | planar | planar | planar | planar |
| Microporous Region [Bipolar Plate Side] | Composition | BF-5A (Aspect Ratio: 20)(Surface Oxygen Concentration {O/C}: less than 0.01) | — | — | — | — | 25 | — |
|  |  | BF-18A (Aspect Ratio: 40)(Surface Oxygen Concentration {O/C}: less than 0.01) | — | — | — | — | — | 25 |
|  |  | Acetylene Black | — | — | — | 100 | 75 | 75 |
|  |  | PTFE Resin | — | — | — | 33 | 33 | 33 |
|  | Shape |  | — | — | — | lattice | lattice | lattice |
| Anti-flooding Characteristic | Output Voltage [V] |  | 0.35 | 0.34 | 0.34 | 0.34 | 0.33 | 0.33 |
| Anti-plugging Characteristic | Evaluation of Voltage Reduction Frequency |  | C | C | C | B | B | B |
| Anti-dry-out Characteristic | Upper Limit Temperature [° C.] |  | 88 | 88 | 89 | 88 | 89 | 89 |

The invention claimed is:

1. A polymer electrolyte fuel cell having a gas diffusion electrode medium, wherein a microporous region is arranged on at least one surface of an electrode base material having pore sizes of 30-80 μm, and the microporous region contains a flake graphite having an aspect ratio of 50 to 5000 and acetylene black, and wherein a mixing mass ratio of the acetylene black to the flake graphite is 0.1 to 4.

2. The polymer electrolyte fuel cell according to claim 1, wherein a microporous region is arranged on both surfaces of an electrode base material, and the microporous region arranged on at least one surface contains a flake graphite having an aspect ratio of 50 to 5000.

3. The polymer electrolyte fuel cell according to claim 1, wherein a mean thickness of the flake graphite is 0.001 to 0.5 μm.

4. The polymer electrolyte fuel cell according to claim 1, wherein the flake graphite has a surface oxygen concentration {O/C} measured by X-ray photoelectron spectroscopy of 0.01 to 0.1.

5. The polymer electrolyte fuel cell according to claim 1, wherein the microporous region contains a water-repelling material.

* * * * *